United States Patent
Mogard et al.

[11] Patent Number: 5,934,496
[45] Date of Patent: *Aug. 10, 1999

[54] ONE-PIECE MOLDED FLIP CAP CLOSURE

[75] Inventors: Jens Mogard, Buffalo Grove, Ill.; Karl-Erik Lundh, Gislavad, Sweden; Gote Elof Rickardsson, Gislaved, Sweden

[73] Assignee: Tetra Laval Holdings & Finance, SA, Pully, Switzerland

[*] Notice: This patent is subject to a terminal disclaimer.

[21] Appl. No.: 08/958,995

[22] Filed: Oct. 28, 1997

Related U.S. Application Data

[60] Provisional application No. 60/030,312, Nov. 1, 1996.

[51] Int. Cl.⁶ .............................. B65D 5/74; B65D 41/50
[52] U.S. Cl. .......................... 220/258; 220/831; 220/837; 215/235; 215/250; 229/125.15; 222/541.5; 222/541.9; 222/556
[58] Field of Search .................................. 220/258, 259, 220/269, 270, 266, 335, 339, 831, 832, 837–839, 847; 215/235, 237, 250, 253, 254, 255, 257, 258, 303, 305, 306, 341, 349; 229/125.04, 125.05, 125.14, 125.15, 125.42, 102, 214; 222/541.1, 541.5, 541.6, 541.9, 556, 562, 567, 569, 570, 498, 153.14

[56] References Cited

U.S. PATENT DOCUMENTS

| | | |
|---|---|---|
| 1,481,217 | 1/1924 | Maloy . |
| 2,808,972 | 10/1957 | Flugge et al. . |
| 2,901,800 | 9/1959 | Koehl . |
| 2,986,309 | 5/1961 | Larson . |
| 3,199,309 | 8/1965 | Brubaker . |
| 3,412,919 | 11/1968 | Cain . |
| 3,608,771 | 9/1971 | Monroe et al. . |
| 3,712,519 | 1/1973 | Collie . |
| 3,733,015 | 5/1973 | Marques . |
| 3,998,354 | 12/1976 | Song et al. . |
| 4,022,357 | 5/1977 | Dwinell . |
| 4,124,134 | 11/1978 | Montgomery . |
| 4,483,464 | 11/1984 | Nomura . |
| 4,669,640 | 6/1987 | Ando et al. . |
| 4,705,197 | 11/1987 | Gordon et al. . |
| 4,730,770 | 3/1988 | Walton . |
| 4,782,996 | 11/1988 | Spahni, Jr. . |
| 4,830,273 | 5/1989 | Kalberer . |
| 4,909,434 | 3/1990 | Jones et al. . |
| 4,925,034 | 5/1990 | Robichaud et al. . |
| 4,964,562 | 10/1990 | Gordon . |
| 4,986,465 | 1/1991 | Jacobsson et al. . |
| 4,990,200 | 2/1991 | Heinz . |
| 5,012,959 | 5/1991 | Gordon . |
| 5,065,938 | 11/1991 | Anderson ........................ 229/125.15 X |
| 5,069,385 | 12/1991 | Färber . |
| 5,076,493 | 12/1991 | Anderson . |
| 5,101,999 | 4/1992 | Robichaud et al. . |
| 5,108,029 | 4/1992 | Abrams et al. . |
| 5,125,886 | 6/1992 | Dirksing . |
| 5,152,438 | 10/1992 | Gordon et al. . |

(List continued on next page.)

FOREIGN PATENT DOCUMENTS

| | | |
|---|---|---|
| 0435279 | 3/1991 | European Pat. Off. . |
| 548010 | 6/1993 | European Pat. Off. .......... 229/125.15 |
| 2-45364 | 2/1990 | Japan .................. 222/541.9 |
| 94/14696 | 7/1994 | WIPO .................. 222/541.6 |

*Primary Examiner*—Stephen K. Cronin
*Assistant Examiner*—Nathan Newhouse

[57] ABSTRACT

A closure for a container and a method of producing the same is set forth. The closure is a single integrally-molded spout, cap and hinge assembly joining the spout and the cap. The closure may also have a membrane and pull-ring, also integrally molded as one piece. The cap may have at least one prop for preventing interference from the cap with the pouring of the contents of the container. Additionally, the spout may have a step for assisting in the prevention of interference from the cap during pouring, and for providing a predetermined sound every time that the cap is opened. Further, the closure may have a tamper-evident member to indicate that the closure has been opened. Still further, the closure may have an orienting peg for properly orienting the closure on a container.

5 Claims, 7 Drawing Sheets

U.S. PATENT DOCUMENTS

| | | |
|---|---|---|
| 5,156,295 | 10/1992 | Gordon et al. . |
| 5,199,635 | 4/1993 | Abrams et al. . |
| 5,203,470 | 4/1993 | Brown .............................. 229/125.15 X |
| 5,244,520 | 9/1993 | Gordon et al. . |
| 5,271,536 | 12/1993 | Wilson ..................................... 222/498 |
| 5,297,696 | 3/1994 | Bernstein et al. . |
| 5,322,176 | 6/1994 | Dubach . |
| 5,366,114 | 11/1994 | Bernstein et al. . |
| 5,601,669 | 2/1997 | Moody . |
| 5,636,771 | 6/1997 | Gordon et al. . |
| 5,636,785 | 6/1997 | Kalberer . |
| 5,657,889 | 8/1997 | Guglielmini . |
| 5,657,891 | 8/1997 | Bilani et al. . |
| 5,735,418 | 4/1998 | Erb et al. ................................ 215/237 |
| 5,735,426 | 4/1998 | Babcock et al. ........................ 220/258 |

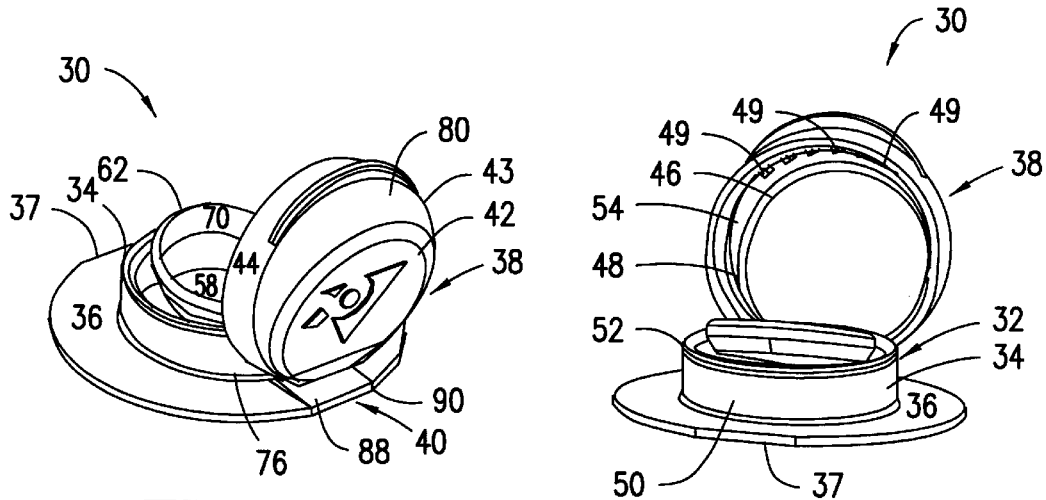
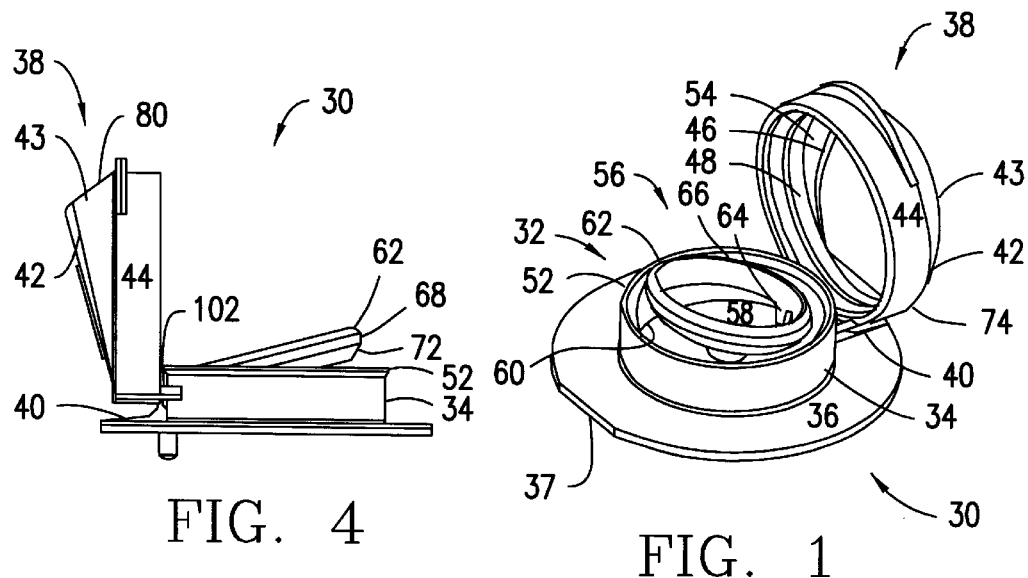

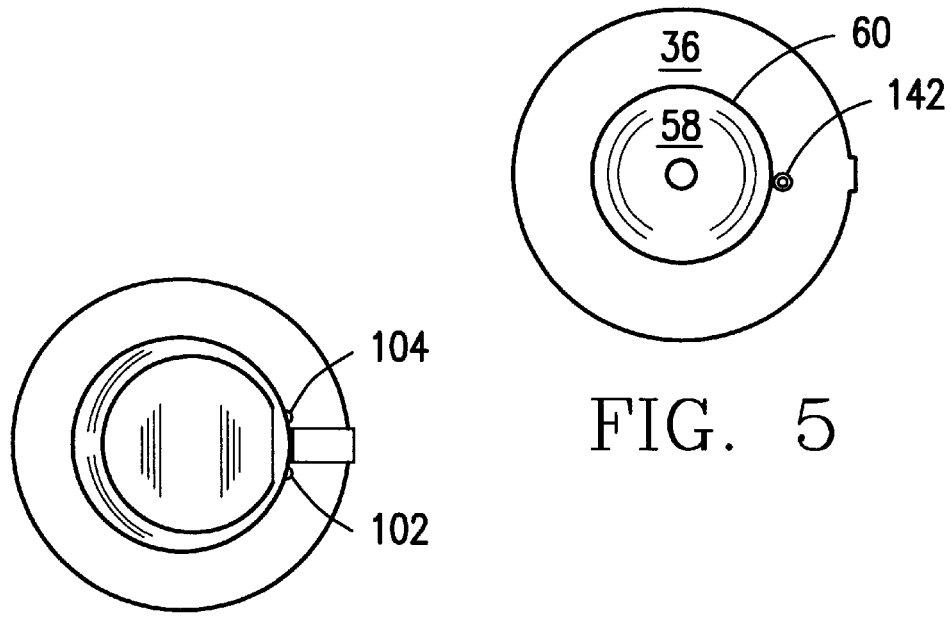
FIG. 5
FIG. 6
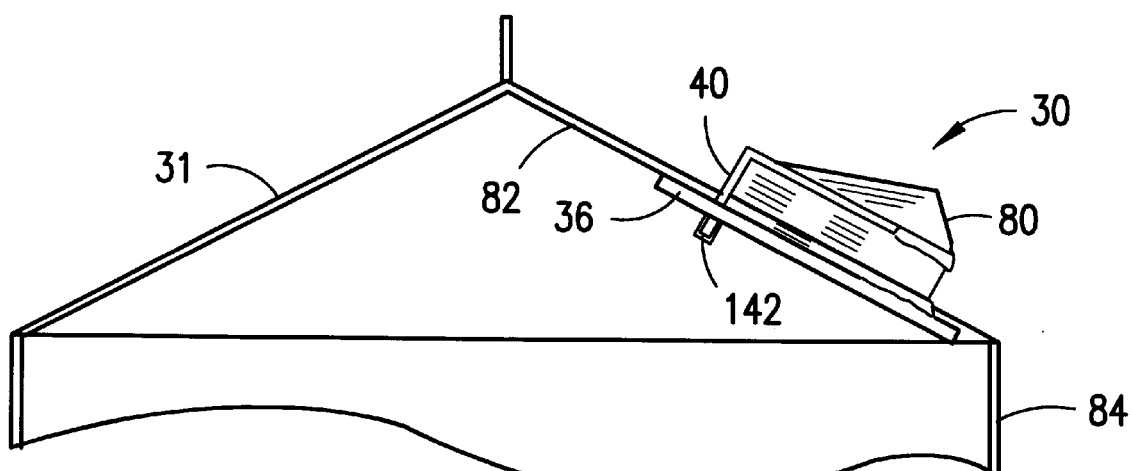
FIG. 7

ONE-PIECE MOLDED FLIP CAP CLOSURE

CROSS REFERENCE TO RELATED APPLICATIONS

This application is a continuation of U.S Provisional application No. 60/030,312, filed Nov. 1, 1996, which is incorporated by refence.

BACKGROUND OF THE INVENTION

1. Field of the Invention

The present invention relates to closures for food packaging. Specifically, the present invention relates to a one-piece flip-cap closure for use in food packaging.

2. Description of the Related Art

Resealable closures are now commonly employed on, for example, gable-top containers. The closures are generally snap-type caps or screw-type caps which are removable from and resealable over an opening of a corresponding spout. Such closures desirably include tamper-evident features to enable a retailer or consumer to determine whether the closure has been opened before.

Conventional closures have certain limitations. For one thing, the closures themselves can be quite costly to produce, frequently being formed from two or more separate parts formed in two or more separate molds using two or more separate injection molding processes and two or more different materials. Even where a single mold is used, costly and complex laterally moving mold elements which move perpendicular to the primary mold closing direction may be required.

Another problem with many closures is the requirement for difficult and expensive assembly operations for finishing the closures and installing them on containers. These operations can require expensive tooling. Even the parts of a simple threaded cap and spout closure for installation through a panel of a gable top container must be separately molded, positioned in relation to each other, assembled, and then held in place in some fashion (such as by installing a tamper-evident joint at the same time) as the cap does not loosen and potentially fall off. These operations are conventionally carried out by the manufacturer of the closures, which are shipped in bulk to the food packager. The food packager must then retrieve each assembled closure from its bulk container, orient it in a packaging machine, and secure the closure to the package as it is assembled and (usually) before it is filled.

A closure with a snap-on cap joined to the spout by an integral hinge is somewhat easier to assemble, in that the cap and spout, and in some instances the tamper-evident structure, are already located in preestablished positions by molding them as one piece.

But snap-on closures often require complex assembly and joining operations to initially close them and place their tamper-evident structure in its operative position. For mass-production closures, complex machinery is required to carry out the assembly operation. Too often, the closure must be assembled in one or more steps, closed in one or more steps, and installed on the container in one or, more steps. The entire manufacturing process can thus include many steps, and many duplicate steps (such as multiple heat sealing operations conducted on different machinery at different times).

The closure assembly must be inserted cleanly through a relatively small aperture in the container when the closure is installed. Commonly, the spout, cap, tamper-evident structure, and other closure elements are inserted through an aperture slightly greater in diameter than the spout, from the inside of the container. If the parts of the closure are not tied securely together and properly located during assembly, one or more appendages of the closure can be dislocated. At a minimum this can result in rejected containers. Worse, the automated mechanism for assembling closures or containers can jam, necessitating a shut-down to correct the problem.

Closures are known which have an impervious membrane or web closing the spout before use and a tear ring located within the spout. In many instances, the tear ring is recessed in the spout, and can be grasped only by inserting a finger into it and pulling it out of the spout to tear and remove the membrane or web and open the spout for use. One difficulty with many such tear rings is that a person with large fingers, or a person using one of his or her larger fingers or a thumb, or a person lacking in dexterity, has difficulty inserting a finger in the recessed ring. The inaccessible edge of the recessed ring cannot be manipulated. The ring is thus difficult to lift out of place so it can be grasped more firmly.

If the entire ring is simply elevated above the mouth of the spout in the same orientation (usually, parallel to the membrane), space must be left under the entire cap to accommodate the elevated ring or tab, thus providing a high-profile closure which projects a substantial distance above the panel in which the closure is mounted. A high profile closure is undesirable, as it can be unsightly and may require more material than a low-profile closure of the same diameter. A high-profile closure mounted on a diagonal top panel of a gable-top container also may project through the plane of the side panel of the container, interfering with packing operations.

Another issue regarding closures is the desirability of forming a closure from polyethylene, which can be heat-sealed or ultrasonically sealed directly to a polyethylene coated paperboard panel or a polyethylene bottle, as opposed to forming the closure from another plastic which must be glued to polyethylene. Gluing is a less desirable and less sanitary assembly method than heat or ultrasonic sealing, in general.

While polyethylene closures are easily installed on polyethylene-coated paperboard and other surfaces by heat or ultrasonic welding, polyethylene has other characteristics which must be dealt with when designing a closure. For example, polyethylene, unlike polypropylene and other plastics, readily inelastically deforms or relaxes during storage, and thus has little springiness or "memory" of its configuration as molded.

For example, assume that a cap, spout, and integral hinge assembly is molded in an open configuration with the inverted cap beside the upright spout and the hinge straight, then the hinge is folded in a "U" shape to position the cap upright above the spout, and the cap is pushed down on the spout. Next, assume the closure is stored for a time, then installed on a container, which is filled, closed, transported, stored for another time, then finally placed in the hands of a consumer.

If the closure is made of polypropylene, when the consumer finally opens the closure, the hinge will be springy or have a "memory" of being open when it was originally molded. The cap will thus spring out of the way of the spout, and not block or be soiled by a stream of fluid contents poured from the spout of the container.

If, however, the closure is made in the same way of polyethylene, the plastic will have relaxed during storage and the cap will not spring out of the way of the spout to the desired degree when the closure is opened. This problem requires the consumer to make a special effort to hold the cap out of the way when dispensing the contents of the container, or to risk soiling the cap and thus providing an unsanitary or unsightly closure.

Accordingly, the inventors have recognized that a need remains within the industry for an improved closure which assists in overcoming the disadvantages experienced in the past and discussed above.

BRIEF SUMMARY OF THE INVENTION

One aspect of the present invention is a closure having all components molded in one piece. Another aspect of the present invention is a method of fabricating the one piece molded closure by folding the cap onto the spout just subsequent to molding. Another aspect of the present invention is a prop disposed on the cap and step disposed on the spout for preventing interference from the cap during pouring of the contents.

It is a primary object of the present invention to provide a closure having a spout and cap formed as a single integral piece.

It is an additional object of the present invention to provide a closure having a prop for preventing interference from the cap during pouring of the contents from the spout.

It is an additional object of the present invention to provide a closure having a stem for assisting in preventing interference from the cap during pouring of the contents from the spout, and for generating a predetermined sound during each removal of the cap from the spout.

It is an additional object of the present invention to provide a closure having an orienting pin integrally formed with the closure.

It is an additional object to provide a closure having a pull ring oriented for facilitated removal of a membrane attached thereto.

Having briefly described this invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

Several features of the present invention are further described in connection with the accompanying drawings in which:

There is illustrated in FIG. 1 a top perspective view of a preferred embodiment of a closure of the present invention;

Figure 8:
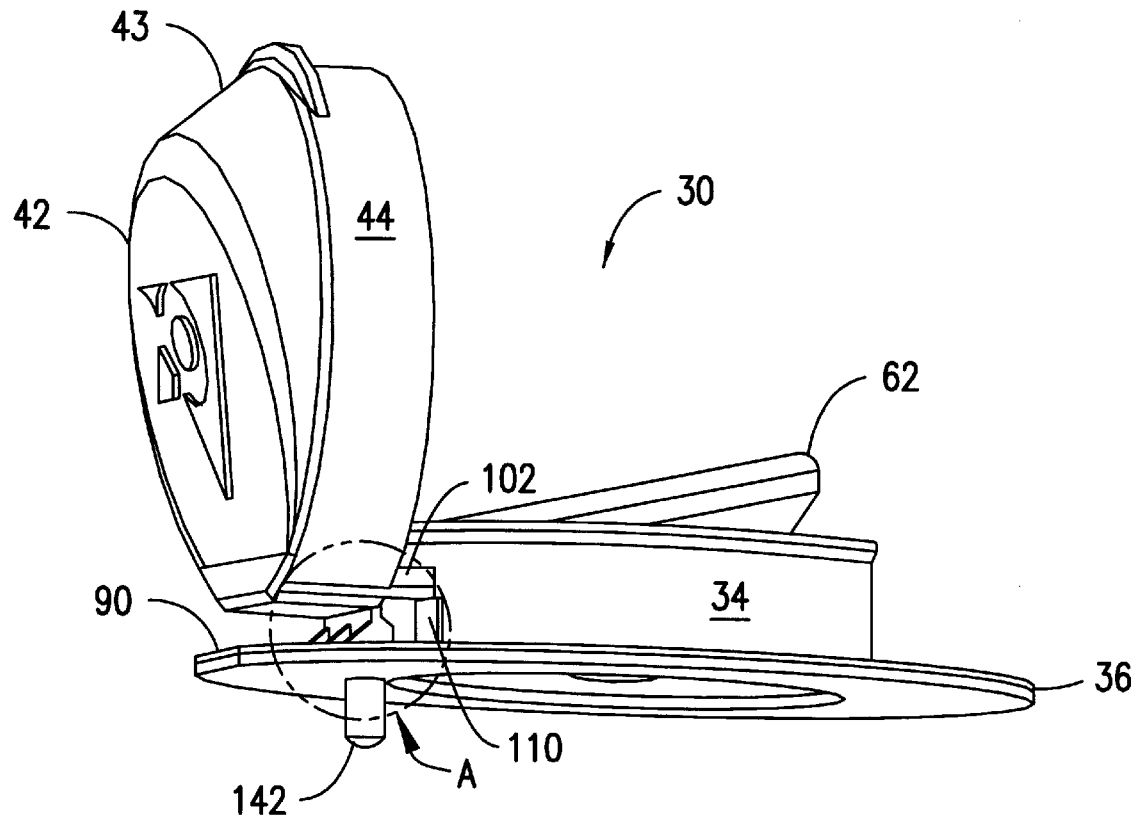
Figure 9:
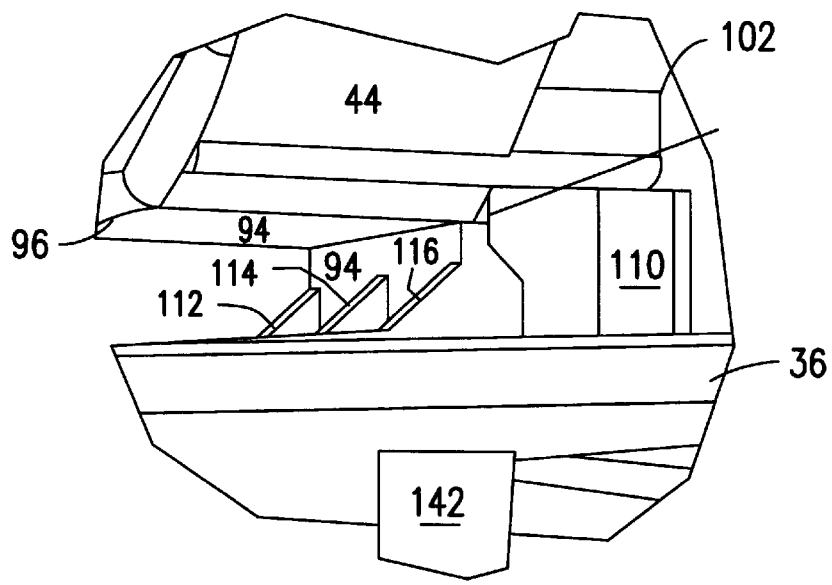
Figure 10:
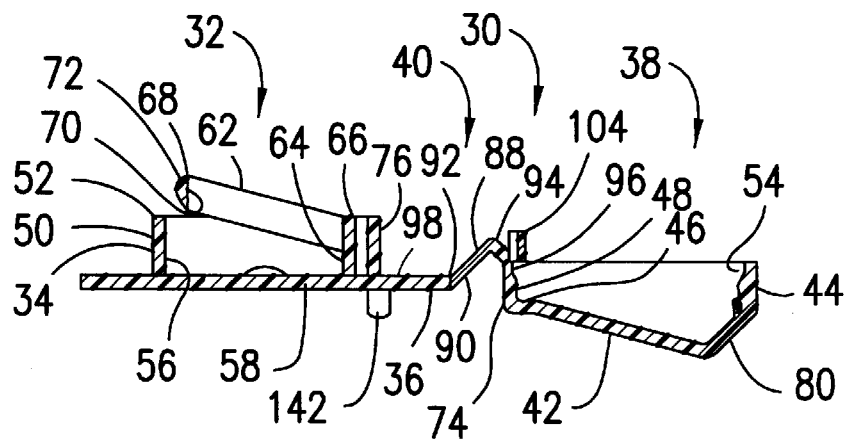
Figure 11:
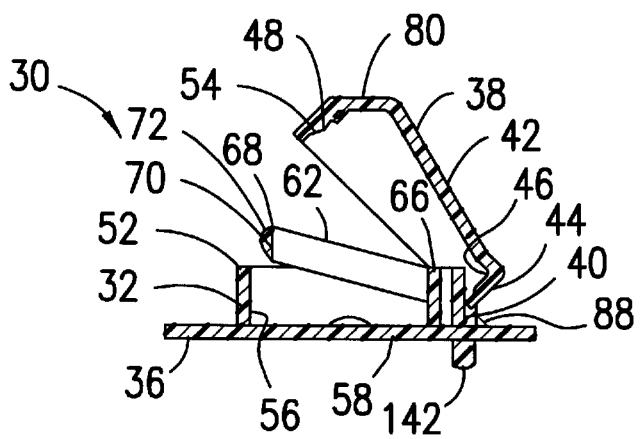
Figure 12:
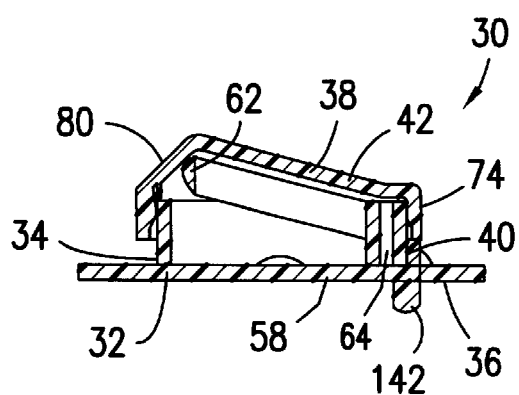
Figure 14:
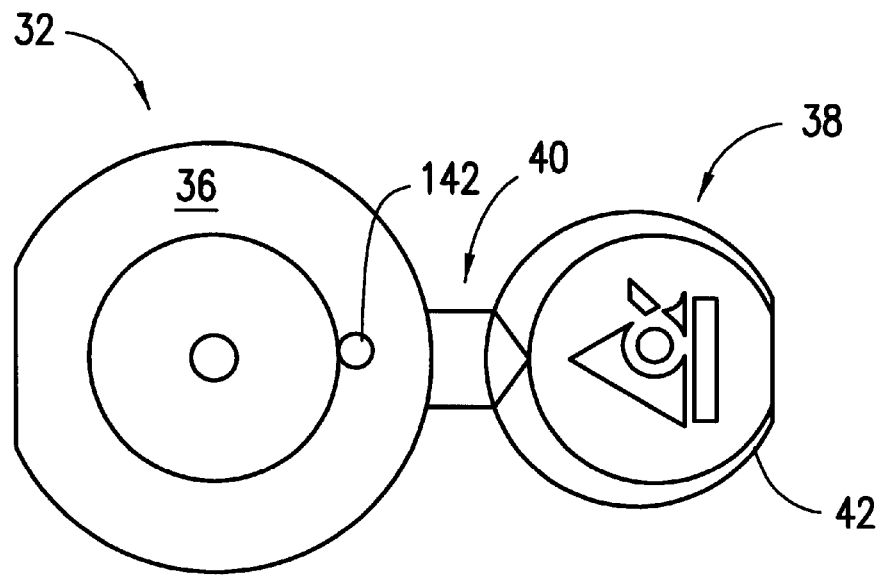
Figure 13:
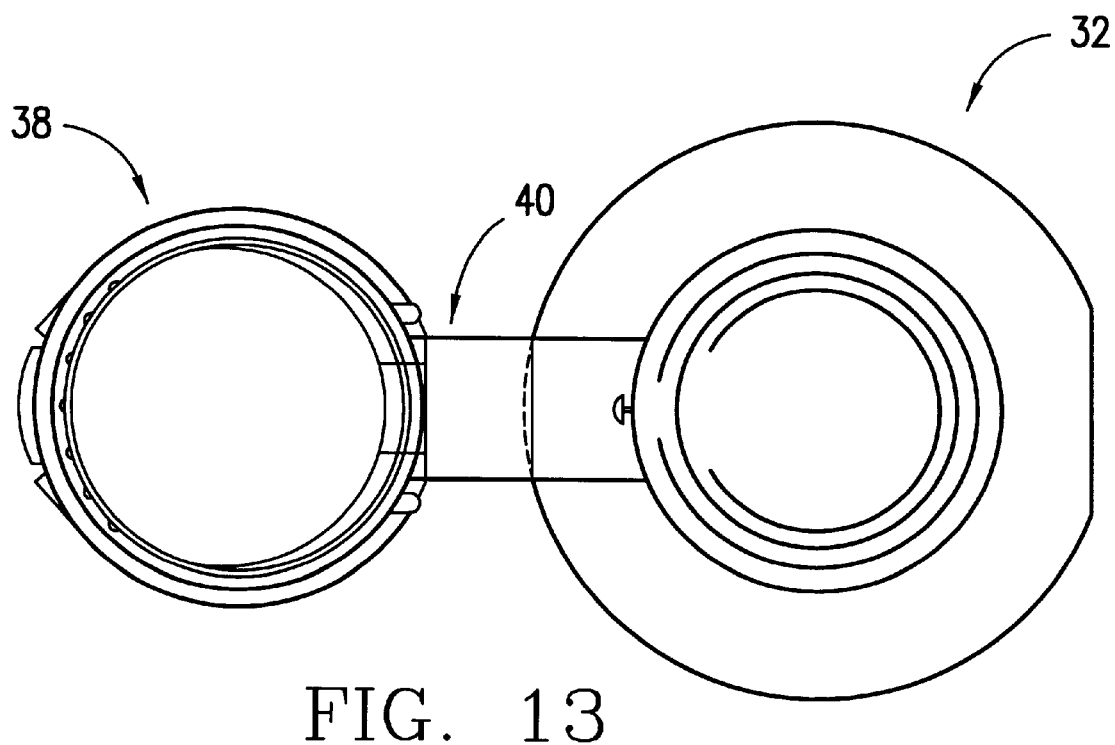
Figure 16:
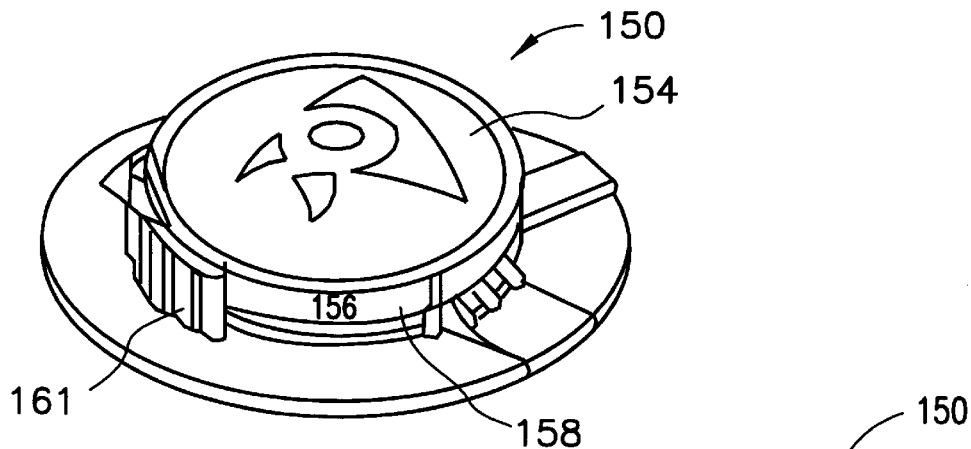
Figure 15:
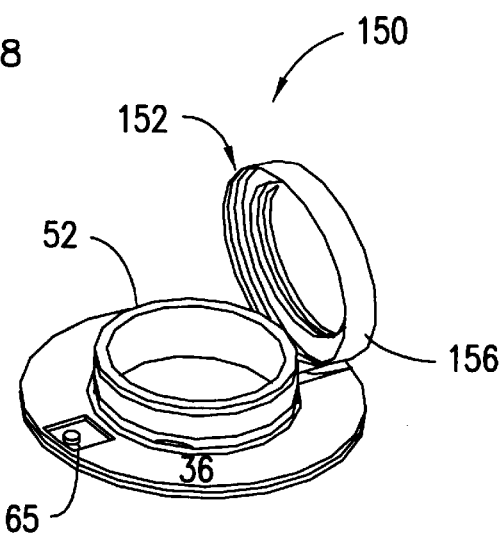
Figure 17:
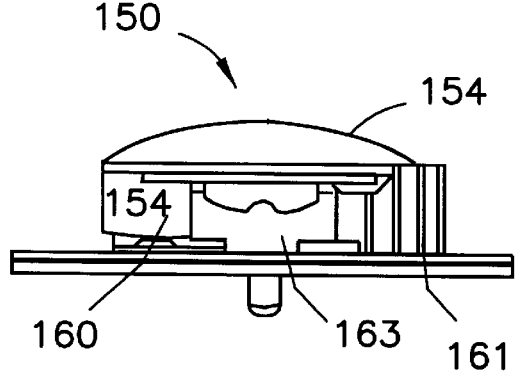
Figure 18:
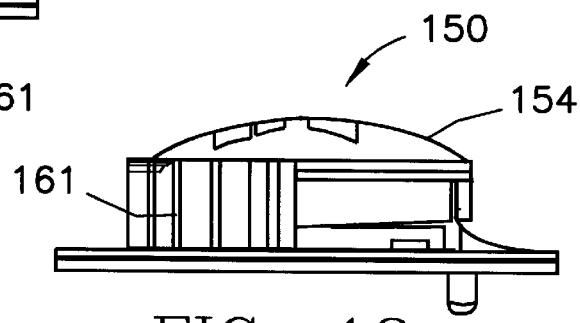

There is illustrated in FIG. 2 a front perspective view of the closure of FIG. 1;

There is illustrated in FIG. 3 a rear perspective view of the closure of FIG. 1;

There is illustrated in FIG. 4 a side view of the closure of FIG. 1;

There is illustrated in FIG. 5 a bottom plan view of the closure of FIG. 1;

There is illustrated in FIG. 6 a top plan view of the closure of FIG. 1;

There is illustrated in FIG. 7 a side perspective of the closure of FIG. 1 attached to a gable-top carton;

There is illustrated in FIG. 8 an enlarged rear perspective of the closure of FIG. 1 to specifically illustrate the step and prop of the closure;

There is illustrated in FIG. 9 an enlarged view of circle A of FIG. 8;

There is illustrated in FIG. 10 a side view of a closure of present invention as formed in a mold;

There is illustrated in FIG. 11 a side view of the closure of FIG. 10 after removal of the closure from the mold and during the folding process;

There is illustrated in FIG. 12 a side view of the closure of FIG. 10 fully folded over for distribution;

There is illustrated in FIG. 13 a bottom plan view of the closure of FIG. 10;

There is illustrated in FIG. 14 a top plan view of the closure of FIG. 10;

There is illustrated in FIG. 15 a perspective view of an alternative embodiment of a closure of the present invention having a tamper-evident device thereon with the closure in the open position;

There is illustrated in FIG. 16 a rear perspective of the closure of FIG. 15 in a closed position;

There is illustrated in FIG. 17 a front plan view of the closure of FIG. 16;

There is illustrated in FIG. 18 a side plan view of the closure of FIG. 16.

Figure 19:
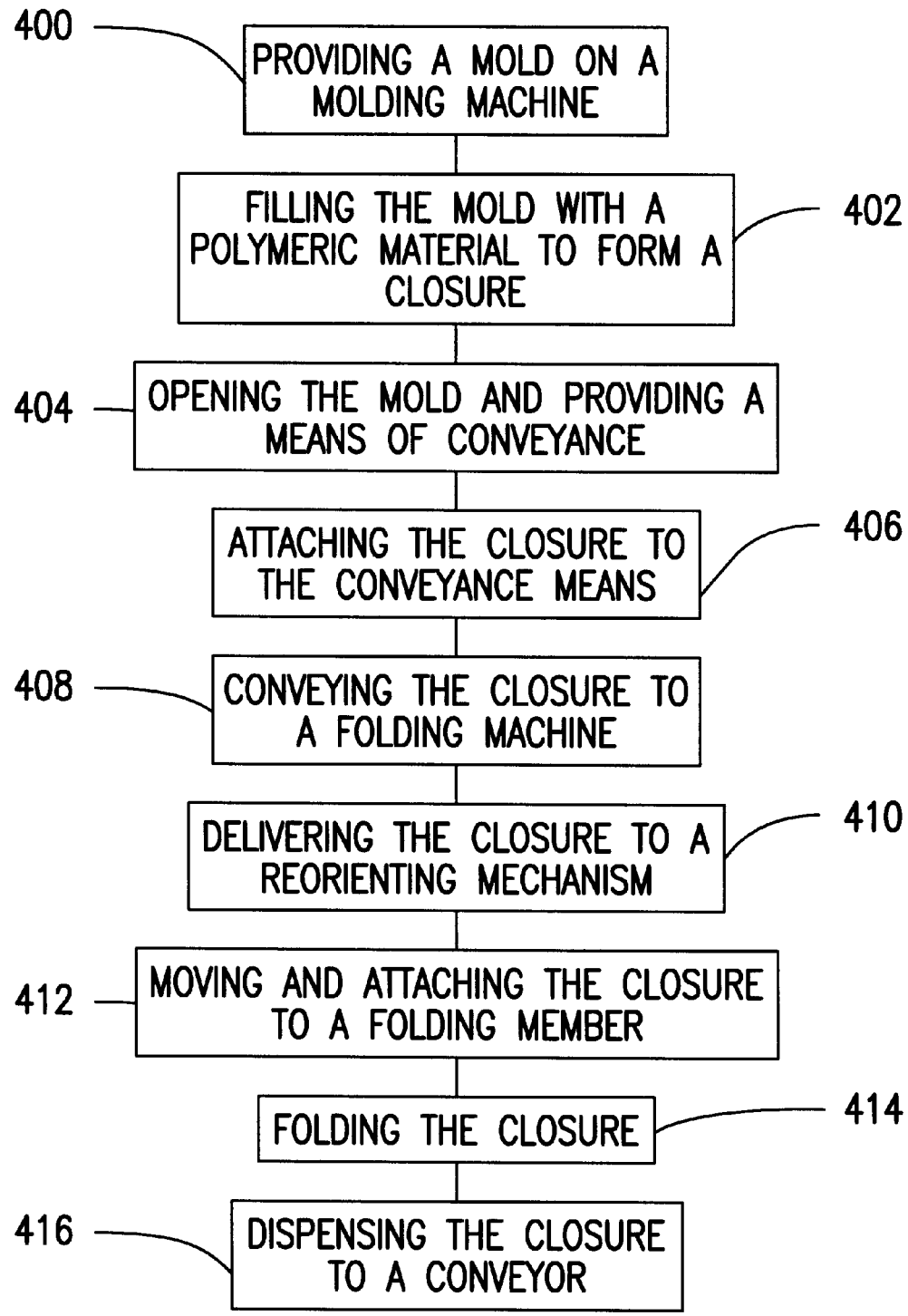

There is illustrated in FIG. 19 a flow diagram of the method of producing the closure of the present invention.

DETAILED DESCRIPTION OF THE INVENTION

There is illustrated in FIGS. 1–9 a preferred embodiment of a re-sealable closure 30 that may be utilized, for example, in conjunction with a gable-top container 31 (see FIG. 7) having a body formed from a paperboard-based substrate that is disposed between outer layers of a thermoplastic polymer material. The closure may also be used with a non-paperboard based polyethylene container, or with other types of containers generally.

The closure 30 is formed as a single, integrally molded piece and generally includes a spout 32 having a stem 34 which is tubular in shape and projects upward from an annular base flange 36 extending about the periphery of the lower end of the stem 34. The base flange 36 has a generally circular shape except for a flat portion 37. The flat portion 37 is optional and assists in orienting the closure 30 during placement on a container 31. The spout 32 is joined with a cap 38 by an integral hinge assembly 40.

The cap 38 resealably engages the stem 34 of the spout 32. In the particular embodiment illustrated here, the cap 38 includes an upper lid 42 surrounded by a downwardly projecting skirt 44. The upper lid 42 may have a beveled edge 43 as a transition between the upper lid 42 and the skirt 44. The skirt 44 and lid 42 cooperate to define a vaulted interior cavity which receives an upper portion of the stem 34 when the cap 38 is secured about the stem 34 to close the closure 30.

An annular recess 46 is formed about the interior of the cap 38 near the intersection of the skirt 44 and the lid 42. An interior surface of the skirt 44 includes an inner rib 48 extending about its interior. The lid 42 and the rib 48 cooperate to define the recess 46 between them. Also included in the interior of the lid 42 are a plurality of engaging rods 49 for engaging with the front of the stem 34. This provides for a tighter reseal of the cap 38 with the spout 32.

The stem 34 includes an upper end 50 having an outwardly flared lip 52 extending about the exterior periphery of the stem 34. The lip 52 engages the recess 46 of the cap 38 when the closure 30 is in a closed position. The skirt 44 includes a beveled surface 54 at its mouth to enable the cap 38 to be easily guided over the lip 52. The lip 52 and rib 48 engage one another to seal the cap 38 over the stem 34. The stem 34 further includes an aperture 56 to enable the contents of the container 31 to be poured out when the cap 38 is removed.

Within the spout 32, an optional membrane 58 may be disposed over the aperture 56. The membrane 58 is a web integrally formed within the stem 34, in this embodiment. The intersection of the membrane 58 and the interior surface of the stem 34 defining the aperture 56 is weakened by the circular groove 60 defining that intersection.

The membrane 58 includes an integral pull ring 62, optionally formed at least approximately concentrically with the stem 34. The pull ring 62 is secured to the membrane 58 by a post 64 which is integral with the membrane 58. The pull ring 62 has a post side 66, a free side 68 approximately diametrically opposed to the post side 66, an inner surface 70, and an outer surface 72.

One particular feature of the pull ring 62 is its tilted orientation relative to the plane of the lip 52. Specifically, the free side 68 of the pull ring 62 projects out of the stem 34 through the lip 52, exposing the portion of the outer surface 72 on the free side 68 of the pull ring 62. The post side 66 of the pull ring 62 is flush with the lip 52, and can optionally be recessed within the stem 34. This orientation of the pull ring has several advantages, such as the following.

This tilted orientation makes the pull ring 62 easier to grasp than a conventional pull ring which is flush with the lip 52 or recessed within the stem 34. If the pull ring were flush or recessed, access to its outer surface 72 would be prevented by the stem 34, particularly if the dimensions of the closure 30 are small (as they desirably are). A flush or recessed ring is usually grasped by inserting a finger or tool to engage the inner surface 70 and lifting the free side 68 of the pull ring 62 out of the stem 34 through the lip 52. Once this is done, the outer surface 72 can be contacted with a second digit, such as the user's thumb, to gain a secure grasp on the pull ring 62. The ring can then be pulled as firmly as necessary to tear out and remove the membrane 58. The process of extracting the free side 62 of the pull ring 62 from the stem 34 can be awkward for a person who lacks dexterity, has large fingers not easily inserted within the inner surface 70, or prefers to insert one of his or her larger fingers, such as the index finger, into the ring 62.

According to the present invention, however, the free side 68 of the pull ring 62 can be permanently elevated out of the stem 34, preferably by inclining the entire pull ring 62. This expedient allows immediate access to the outer surface 72 without first extracting the free side 68 of the pull ring 62. One can push the outer surface 72 with a finger of essentially any size and move it parallel to the plane of the lip 52 and toward the post 64. This action further tilts up the pull ring 62, which can then be grasped readily to break the membrane 58 and pull it out of the stem 34.

The tilted orientation of the pull ring 62 also allows the cap 38 to have a shorter skirt 44 around part of its circumference, and thus a lower profile for the closure 30, than would otherwise be possible. A hinge side 74 of the skirt 44 needs only to be as long as necessary to engage a hinge side 76 of the stem 34, without allowing any additional "head room" above the lip 52 to accommodate the protruding post side 66 of the pull ring 62. The only "head room" required by the illustrated embodiment is in the portion of the lid 42 confronting the portion of the free side 68 projecting above the lip 52. Thus, less material can be used for the closure 30 if the pull ring 62 is tilted up from its post side 66 to its free side 68.

The particular vaulted design of the cap 38 has both ornamental and functional advantages. One of its functional advantages is that, if the closure 30 is oriented with the hinge assembly 40 at a higher elevation than the diametrically opposed edge of the cap 38 on an inclined top panel 82 of a gable top carton 31, as shown in FIG. 7, the surface 80 diametrically opposed to the hinge assembly 40 is roughly parallel to the adjacent side panel 84 of the carton. The surface 80 can thus extend as far above the base flange 36 as necessary to accommodate the raised free side 68 of the pull ring 62, without projecting through the plane of the side panel 84. This feature allows a series of gable-top cartons to be slipped vertically into a packing carton, with each of their four side panels such as 84 abutting a side panel of another gable-top carton or a vertical wall of the packing carton, without the bottom of one gable top carton striking the closure of another gable top carton. Those skilled in the art will recognize that the closure 30 of the present invention may be attached to exterior surface of a container 31 and thus is not limited to attached from the interior of the container 31.

This functional feature could, of course, be provided in a closure having a substantially different shape and appearance of the lid 42, even an entirely flat lid. A flat lid atop a skirt of varying height could be accommodated by rotating the pull ring 62 and the post 64 180 degrees, exchanging the free side 68 and the post side 66 of the pull ring 62. This would put the part of the lid 42 which must be highest further from the plane of the side panel 84 than the other part of the lid 42.

With particular reference to FIGS. 10–14, the integral hinge assembly 40, as molded, includes an L-shaped link 88 having a first portion 90 connected to the flange 36 by an integral hinge 92 and a second portion 94 attached to the cap 38 by an integral hinge 96. The first portion 90 in this embodiment is about as long as the width of the flange 36, at least in the area of the hinge assembly 40. The second portion 94 can be shorter than the height of the stem 34 in the area of the hinge assembly 40.

The first portion 90 is sized and shaped, and the integral hinge 92 is sufficiently flexible, to allow the first portion 90 to be pivoted into, and in this embodiment just fill, the recess 98 in the base flange 36. The second portion 94 elevates the lower margin of the skirt 44 above the base flange 36, thus reducing the necessary height of the skirt 44 and saving material, while reducing the necessary clearance between the inner circumference of the mouth of the skirt 44 and the outer circumference of the lip 52.

The cap 38 includes a pair of integral props 102 and 104 on the respective sides of the hinge assembly 40. The props 102 and 104 are shown most prominently in FIGS. 8 and 9. When the cap 38 is opened for pouring the contents of a container 31 through the spout 32, the props 102 and 104 are nearly perpendicular to and bear against the stem 34 to keep the cap 38 clear of the emerging contents of the container 31. This is necessary due to the tendency of the cap 38 to partially reseal during pouring due to the effects of gravity and the cap's 38 shape memory as previously explained. The props 102 and 104 preferably maintain the cap 38 at a ninety degree angle to the top of the stem 34. When the cap 38 is closed, the props 102 and 104 sweep down the stem 34 and are stowed against or near the stem 34 and nearly perpendicular to the base flange 36. Also shown in FIGS. 8 and 9 is a step 110 which is integral with the stem 34 of the spout 32. The step 110 further assists the prop 102 (and a corresponding step 110, not shown, assists the prop 104) with preventing interference from the cap 38 during pouring of the contents from a container. Both the props 102 and 104 and the steps 110 are integrally formed with the closure 30 as further described below.

As illustrated in FIGS. 10–14, the closure 30 is formed as a single piece, preferably from a heat sealable thermoplastic material such as polyethylene, by injection molding or the like. The closure 30 may be advantageously molded within a single injection molding tool in its expanded position illustrated in FIG. 10. Such a molding tool is both simple and economical to form. Additionally, such a tool is easy to maintain. Overall, the single, integral structure shown here gives rise to a closure 30 that is more economical to manufacture than other closures 30 in common use today, such as those comprising separate cap 38 and spout 32 sections. Once the closure 30 is formed as shown in FIGS. 10, 13 and 14, it is folded over as illustrated in FIG. 11. This folding occurs subsequent to removal from a mold and also subsequent to at least partial cooling of the closure 30. As shown in FIG. 12, the cap 38 is completely folded over to engage with the spout 32. The closure 30 of FIG. 12 is then ready for distribution to a facility where it will eventually be attached to a container on a form, fill and seal packaging machine.

Another feature of the present invention is an orientation peg 142 which projects from the base flange 36 and is eccentrically positioned relative to the center of the closure 30. The peg 142 can be provided by leaving a short column of the material formed in a runner of the mold cavity leading to the underside of the closure 30 when the superfluous material is trimmed from the closure 30.

The orientation peg 142 can be used to orient the closure 30 when it is to be used in a packaging machine. This step is necessary because the closures 30 are conventionally packed in random orientation in a bulk carton, but each closure 30 should face in the same direction when installed on a package.

The assembled and oriented closure 30 is inserted into an aperture of a container 31. Preferably, the closure 30 is inserted to the position shown in FIG. 2a so that the flange 36 engages the interior, thermoplastic surface of the container 31. Alternatively, the flange 36 may engage the exterior, thermoplastic surface of the container 31.

The closure 30 is preferably secured to the container 31 by ultrasonic sealing, heat sealing, pressure sealing, or combinations of these types of sealing mechanisms. Using these types of sealing, the interior thermoplastic layer of the container 31 and the material of the base flange 36 are melted and the interface between them is substantially eliminated (i.e. they are welded) to secure the flange. An ultrasonic sealing horn may be readily configured to surround the cap 38 and stem 34 and engage the area of the exterior of the container 31 about the flange 36 to permanently secure the flange 36 to the container 31.

One particular advantage of the present invention is that the sealing force for permanently assembling the hinge assembly 40 to the base flange 36 can be applied by the mechanism which joins the base flange 36 to the container 31. The ultrasonic, heat, or other energy applied to the flange 36 to seal the flange 36 to the container 31 also heats the first portion 90 of the L-shaped link 88 and the flange walls defining the recess 98, sealing them together. Once this is done, the recesses 98 is full of plastic and thus no longer interrupt the otherwise smooth, generally annular base flange 36.

In the illustrated arrangement, the first portion 90 and the recess 98 are both positioned between the base flange 36 and the inner wall of the container 31 when the assembly is welded together. As a result, most cosmetic imperfections caused by filling the recesses in the base flange are not visible from outside the container 31.

A standard packaging machine may be used to form the closure 30 and seal it to the container 31 with a minimal amount of additional tooling. This is due, at least in part, to the fact that only one sealing tool, for example an ultrasonic sealing tool, is needed to facilitate the sealing. Thus, the overall cost for tooling is reduced, while part production costs and production maintenance is reduced by utilizing a single-piece, low maintenance injection molding tool in the molding process. A further advantage is that the present closure 30 design can be preferably manufactured through a process in which the molding tool is only moved along a single axis running in the mold parting and closing direction.

Alternative, although generally less efficient, processes for securing the closure 30 to the container 31 are also contemplated. For example, adhesives may be used to join the parts of the closure 30, or to attach the closure 30 to a container 31.

FIGS. 15 through 17 illustrate another embodiment 150 of the closure. One distinguishing feature of the closure 150 is the shape of its cap 152, which has a generally rounded lid 154 while other variations on this embodiment may have the lid 154 as a flat lid 154. The shape of the cap 152 affords a closure 150 having an extremely low height or profile. The height of the closure 150 can be the sum of the height of the lip 52 above the flange, plus the thickness of the lid 154, minus the thickness of the container wall through which the closure is inserted. This embodiment also has a tamper-evident means 161 which may be connected to the cap and spout by breakable bridges. The tamper-evident means has an attachment member 163 for engaging with a recess 165 located on the flange 36. The closure 30 shown in FIG. 15 has the tamper-evidnet means 161 removed after opening of the closure 30. Such a similar tamper evident means may be placed on the previous embodiment, on one side or on both sides of the cap.

The generally cylindrical skirt 156 of the cap 152 is also modified to make the cap 52 easier to close on the stem 34. The hinged side 158 of the skirt 156 is shorter than the swinging side 160 of the skirt 156. This change slightly increases the diameter of the mouth 162 of the skirt 156 from the hinge side 158 to the swinging side 160, without decreasing its diameter in the perpendicular direction, and without changing the diameter of the skirt 156 measured parallel to the lid 154. The increased long diameter of the oval mouth 162 allows it to more easily capture the portion of the lip 52 which is diametrically opposed to the hinge assembly 40 than a round mouth could do. Yet, the skirt 156 remains circular in its cross-sections perpendicular to the axis 164, so the skirt 156 mates with the entire circumference of the stem 34 as in the first embodiment.

Another difference between the closure 150 of FIGS. 15–18 and the closure 30 of FIGS. 1–14 is that the closure 150 lacks an integral sealing membrane 58 and pull ring 62. A separate membrane tape or patch can be applied to the inside of the container 31 to cover the base flange 36. Alternatively, for some purposes the seating relation of the cap 152 and the spout 32 may be sufficiently fluid-tight, particularly with the tamper-evident structure 161 intact, to allow the membrane 58 to be eliminated.

A simple folding step can be employed to position the cap, the spout, and the tamper-evident tear strip from their as-molded positions to their closed positions, without requiring "tacking" or other heating operations. The closure can be snapped shut reasonably securely, without gluing or welding its parts together, so it will remain closed during handling and can easily be inserted cleanly through a small aperture in a container.

An orientation peg, optionally formed as a vestige of the plastic remaining in a mold runner, can be provided to cause the closure to self orient with its hinged side trailing when sliding down an incline. The orientation ability of the inclined surface may be accentuated by roughening the surface of the incline.

The closure can have a pull ring for breaking and removing a sealing membrane within the spout. The pull ring can be positioned with its free side projecting above the rim of the spout at one point in the spout circumference. The pull ring can be contacted on the outside with a finger and pushed further up to permit it to be grabbed. If molded polyethylene (which provides heat-sealability to polyethylene coated board but little resilience), the cap can be vaulted to provide interior room for accommodating the raised part of the pull ring.

The vaulted cap of the closure can be provided in an aesthetically pleasing configuration which still has a relatively low profile. The low profile configuration can also have functional features, such as a front raised surface which extends vertically from a slanted panel of a gable top container so it will not project through the plane of any of the side panels of the container.

The cap can have one or more molded-in legs extending from the cap near the hinge. The legs will erect against the outside of the spout 32 when the cap 38 is opened to hold the cap 38 out of the way of the spout 32. These legs can fold against the spout 32 when the cap 38 is closed. This allows the closure 30 to be molded of easily sealed polyethylene, which has no memory and inelastically deforms during storage.

The closures can be easily assembled to their closed positions, and their parts and appendages can stay in their closed positions during further handling without requiring any welding operations or the like. The sealing operations necessary to provide a closure durable enough for use can be carried out at the same time the closure is joined to a container wall, using the same ultrasonic tool or other energy source, fastener, or adhesive used to attach the closure to an inside wall of the container. This expedient saves a manufacturing step and avoids deformation of the closure which could be caused by a plastic welding operation carried out on the closure before installing the closure in a container.

The flat cap alternatively provided in the closure can have an exceedingly low profile. The swinging side of the skirt of the closure can be deeper than the hinged side of the skirt. This configuration allows the mouth of the cap to reach slightly further to capture the fee side of the lip of the stem.

There is illustrated in FIG. 19 a flow diagram of the method of producing the closure of the present invention. As shown in FIG. 19, at step 400 a mold is provided for a closure. The mold may be on a injection molding machine which may also have additional molds with a preferred number of molds being 64 molds. The mold has a cavity designed to form the closure of the present invention with a spout, a cap and a hinge assembly connecting the spout and cap. If desired, the mold will also form a tamper-eveident structure as part of the one piece closure. At step 402, the mold is filled with a polymeric material to be formed into an integral one-piece closure. A preferred polymeric material is polyethylene, however, other polymeric materials may be used in fabricating the closure. At step 404 the mold is opened and a means of conveyance is provided to convey the closure from the molding machine to a folding machine. The mold will only be open slightly to allow for a very thin conveyance means to move into a position accros from the closure. The conveyance means may be flat arm having partitioned areas for receiving a closure. At step 406, the closure is attached to the conveyance means. This may occur through pushing of the closure out from the mold by means of a pin from the backside of the closure. The conveyance means may also have a vacuum for receiving the closure and to secure attachment for transport to the folding machine.

At step 408, the closure is conveyed to an adjacent folding machine on the conveyance means. At step 410, the closure is delivered from the conveyance means to a reorienting means. The closure is placed on the reorienting means with the bottom of the spout and the top of the cap facing outward in an unfoldable orientation. The orientation is unfoldable in that the hinge assembly would be broken if folded, and the spout would not be covered as desired. The reorientation means may be a flat sheet having a groove with or without a vacuum for accepting the closure. At 412, the reorientation means moves and attaches the closure to a folding device thereby reorienting the closure to a foldable orientation with the bottom of the spout and the top of the cap facing inward. At step 414, the cap is folded onto the spout by the folding device. The folding device may operate similar to a door hinge in folding the cap onto the spout. At 416, the closure is released from the folding device onto a conveyor mechanism disposed below for packaging and distribution.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A closure for a container, the closure comprising:

a spout having a substantially flat flange and an annular stem projecting therefrom, the annular stem defining an aperture, the flange having a top surface and a bottom surface, the annular stem projecting substantially perpendicular from the top surface of the flange a predetermined length and defining a predetermined circumference, the annular stem having an exterior side and an interior side;

at least one step mounted on the stem and perpendicular to the flange, the at least one step having a length less than the predetermined length of the stem, the at least on step having a top;

a cap moveable between an open position and a closed position, the cap having a lid and an annular skirt projecting therefrom, the annular skirt having a circumference greater than the predetermined circumference of the annular stem, the skirt having at least one prop projecting therefrom, the at least one prop extending toward the flange when the cap is in the closed position and in the open position, a bottom portion of the at least one prop engaged with the exterior side of the stem and also with the top of the at least one step; and a hinge assembly connecting the cap to the spout, the hinge allowing for the reclosable opening of the cap from the spout while maintaining the attachment of the cap with the spout.

2. The closure according claim 1 further comprising an orienting peg disposed on the closure to properly orient the closure for placement on a container.

3. The closure according to claim 1 further comprising a pull ring connected to a membrane by a post, the membrane disposed within the aperture, whereby the membrane is removed through actuation of the pull ring.

4. The closure according to claim 3 wherein the cap has a beveled transition between the lid and the skirt allowing for the lid to be angled, the angled lid providing for the pull ring to be angled in correspondence with the lid, whereby the pull ring is easily attainable by a user.

5. A closure for a container, the closure having a forward end and a rearward end, the closure comprising:

a spout having a substantially flat flange and an annular stem projecting therefrom, the annular stem defining an aperture, the flange having a top surface and a bottom surface, the annular stem projecting substantially perpendicular from the top surface of the flange a predetermined length and defining a predetermined circumference, the annular stem having an exterior side and an interior side;

a cap having a lid and an annular skirt projecting therefrom, the annular skirt having a circumference greater than the predetermined circumference of the annular stem, the skirt having at least one prop projecting therefrom, the at least one prop extending toward the flange when the cap is in the closed position and in the open position, a bottom portion of the at least one prop engaged with the exterior side of the stem, the lid angled upward toward the forward end of the closure, the cap also having a beveled edge juxtaposed to the lid and annular skirt, the beveled edge having its greater length between the lid and the annular skirt at the forward end of the closure and diminishing toward the rearward end of the closure;

a membrane covering the aperture and removeably connected to the interior surface of the stem, the membrane connected to a post at one end of the post, the post connected to a ring at another end, the ring angled substantial parallel to the angle of the lid; and a hinge assembly connecting the cap to the spout, the hinge allowing for the reclosable opening of the cap from the spout while maintaining the attachment of the cap with the spout.

* * * * *